United States Patent [19]

Derue

[11] 3,998,048
[45] Dec. 21, 1976

[54] RAM AIR INTAKES OF ROTARY-WING AIRCRAFT TURBINE ENGINES

[75] Inventor: Anicet Derue, Aix-en-Provence, France

[73] Assignee: Societe Nationale Industrielle Aerospatiale, Paris, France

[22] Filed: Nov. 7, 1974

[21] Appl. No.: 521,660

[30] Foreign Application Priority Data

Nov. 9, 1973  France .............................. 73.39884

[52] U.S. Cl. ............................ 60/39.09 P; 55/306
[51] Int. Cl.² ........................................ F02C 7/04
[58] Field of Search ............. 60/39.09 P; 137/15.1, 137/15.2; 92/98 D; 55/306

[56] References Cited
UNITED STATES PATENTS

| | | | |
|---|---|---|---|
| 3,082,792 | 3/1963 | Jenkins | 92/98 D |
| 3,302,396 | 2/1967 | Robbins | 60/39.09 P |
| 3,421,246 | 1/1969 | Beurer | 60/39.09 P |
| 3,483,676 | 12/1969 | Sangisson | 60/39.09 P |
| 3,508,838 | 4/1970 | Martenson | 137/15.1 |
| 3,692,141 | 9/1972 | Labussiene | 137/15.1 |
| 3,811,254 | 5/1974 | Amelio | 60/39.09 P |

*Primary Examiner*—Carlton R. Croyle
*Assistant Examiner*—L. F. Casaregola

[57] ABSTRACT

The invention relates to equipment for the air intake of an aircraft turbine engine, which equipment includes an inlet duct capable of being obturated by a bullet therein, and a bullet thrust mechanism connected to the duct by studs forming bullet guides. Part of the duct is formed by box members for receiving a plurality of separating elements downstream of deflectors, the internal face of the duct lip together with the external face of the bullet and of a jack piston and cylinder of said thrust mechanism being made of soundproofing material.

5 Claims, 3 Drawing Figures

RAM AIR INTAKES OF ROTARY-WING AIRCRAFT TURBINE ENGINES

The technical province of this invention is that of aircraft equipment.

The present invention relates to improvements to ram air intakes of aircraft turbine engines, more particularly on rotary-wing aircraft. The special conditions under which rotary-wing aircraft are used often require them to operate in very severe environments. During take-off and/or landing, in particular, the air blast from the rotor against the ground raises dust and gravel which, if ingested by the engines, can cause serious damage to various engine components. It is consequently necessary to rid the air fed to the engines of any particles in suspension it may contain.

Moreover, rotary-wing aircraft may encounter icing conditions in flight,, making it necessary to provide their engines with protection against ice formation on their air intakes or against the ingestion of snow and/or pieces of ice which become detached from the front of the fuselage, since such extraneous material can interfere seriously with the running of the engines and cause damage therein.

Further, the frequent use of helicopters from heliports located in built-up areas make it essential to reduce the noise generated by them, most of which is produced by the engines and more specifically by the engine compressors in the case of turbine engines.

These various requirements have led fixed- and rotary-wing aircraft manufacturers to design turbine engine air intakes with means for protecting them against the ingestion of harmful particles such as dust, sand, gravel, snow or ice, and with further means for reducing compressor noise.

French Pat. No. 1,331,513 provides an arrangement for avoiding ice formation on the air inlets of temporarily used aircraft turbojets, comprising a movable air flow spoiler element which generates eddies and which can be positioned in front of the inlet of a turbojet while the same is not in use.

French Pat. No. 1,409,480 relates to a separator for removing foreign material from a helicopter engine air intake, comprising an area for collecting such material and a passage with dual profiles, one of which is for discharging said foreign material and the other for channelling the cleansed air.

French Pat. No. 1,585,516 relates to helicopter gas turbine air intakes making combined use of a large number of filters equipped with valves and arranged radially with respect to the longitudinal axis of the turbine, and of axially arranged blocking flaps, the filter valves being closed when air flows axially and open when the axial flow is blocked.

Similarly, French patent application No. 2,005,792 provides for arranging composite-structure panels over the internal face of the tubular shroud of a turbojet and over the external face of the engine-pod surrounding said shroud, which panels are designed to damp the noise produced by a blower.

In French patent application No. 2,018,309, gas turbine engine noise is eliminated through the use of means for localizing the noise produced in a compressor duct and causing it to be efficiently absorbed in the duct, or its propagation from the duct to be controlled for minimal harmful effects, when an aircraft is in the immediate vicinity of a population centre.

These different systems and arrangements are for the most part mutually incompatible and cannot therefore be installed at the same time on aircraft like helicopters. This has been a serious drawback to the operation of such machines, which in flight may encounter a variety of aggressive agents against which their engines must be protected, in conjunction with the need to reduce the noise radiated by their compressors.

In addition, prior art protection means against the ingestion of sand or ice restrict and in some cases entirely deprive engine air intakes of the dynamic ram pressure resulting from forward flight, thereby causing increased fuel consumption and a loss of engine power of the order of 5% or more.

The present invention has for its object to overcome these drawbacks by providing a multipurpose equipment for an aircraft turbine engine air intake, characterized in that it includes a divergent-forming annular intake duct capable of being obturated by a bullet-shaped body movable axially by a thrust mechanism connected to the intake duct through struts which also form bullet guide means. The cylindrical part of the intake duct is formed into box-like compartments for receiving a plurality of particle filters supplied with air which is perturbed by deflector elements positioned upstream, and the internal face of the intake duct lip and the external faces of the bullet-shaped body and of a jack piston and cylinder of the thrust mechanism being formed with a substance made of soundproofing material.

Such equipment is capable of simultaneously performing the following functions:
  Filtering of the air supplied to the turbine engine, thereby providing protection against the ingestion of dust, gravel, sand or even ice, liable to cause compressor damage through erosion.
  Protection against the formation of ice and/or the ingestion of snow or ice liable to obstruct the free flow of air to the engine or of interfering with combustion in the engine.
  Engine compressor noise abatement.
  Ensuring that air is supplied to the turbine engine by the ram effect produced by forward flight, thereby to substantially increase engine power.

The description which follows with reference to the accompanying non-limitative exemplary drawings will give a clear understanding of how the invention can be carried into practice.

Figure 1:
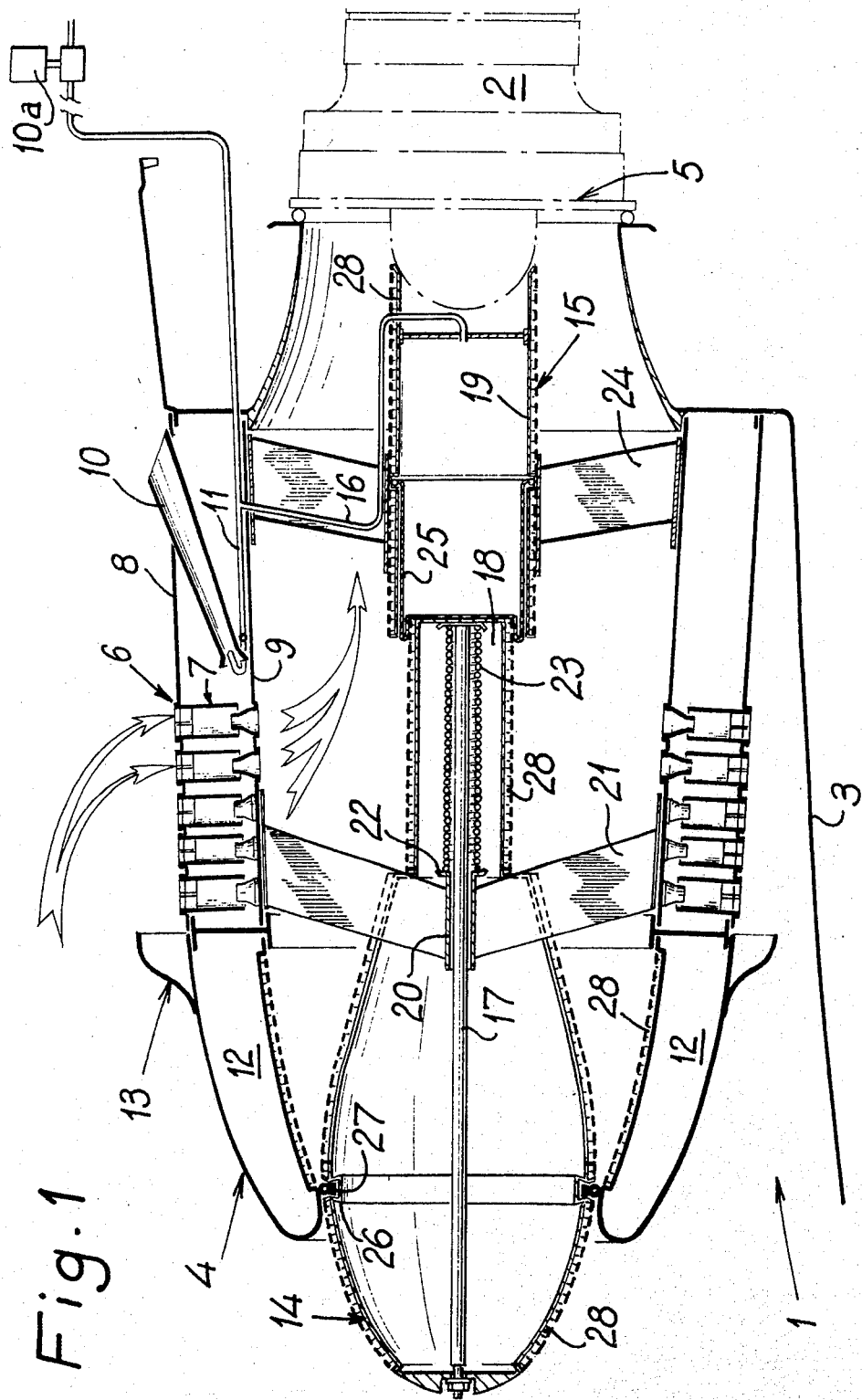
FIG. 1 shows in axial section a helicopter turbine-engine air intake with a bullet in the forward position for plugging the engine air inlet.
Figure 2:
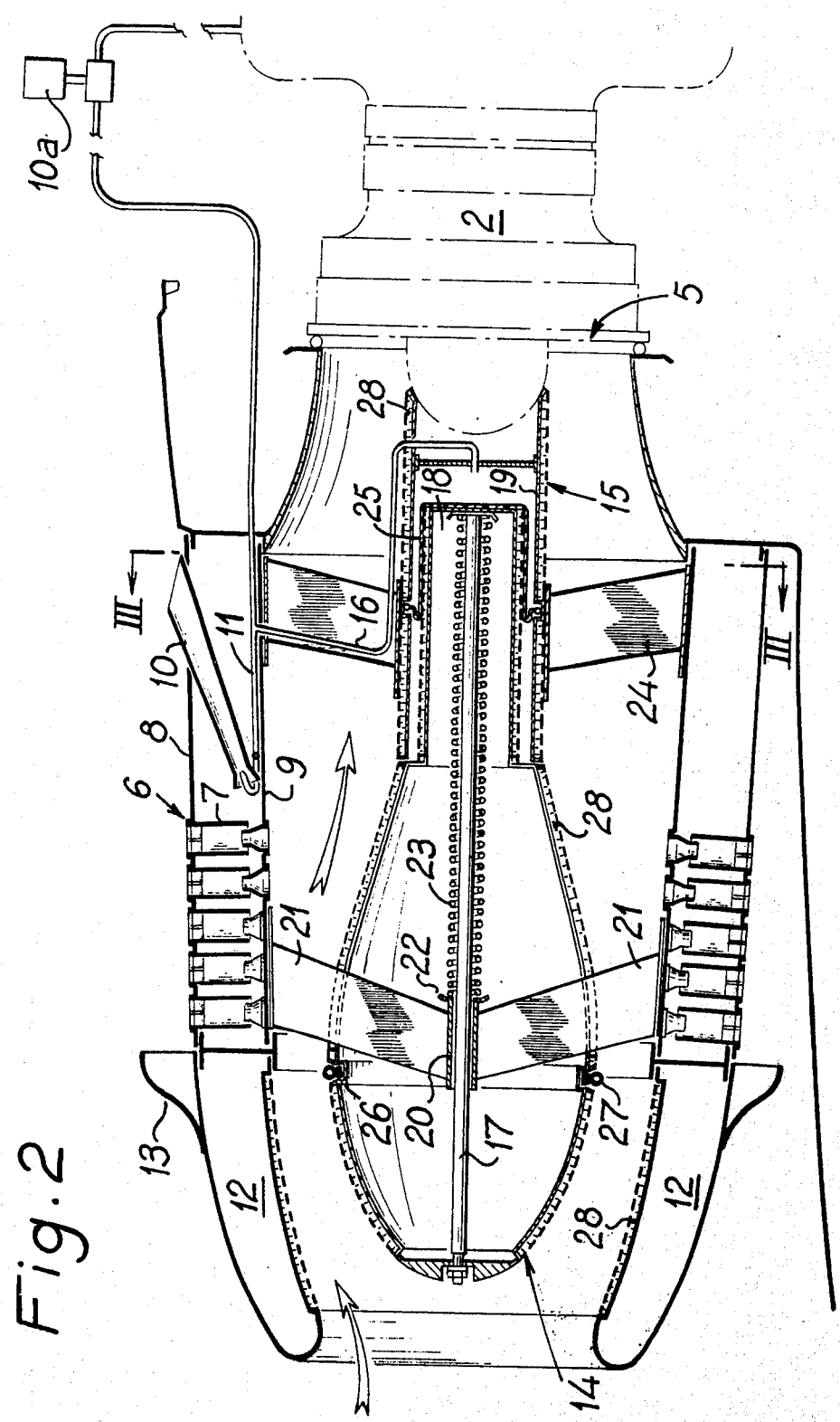
FIG. 2 is a showing in axial section of the same air intake with the bullet in the retracted position.
Figure 3:
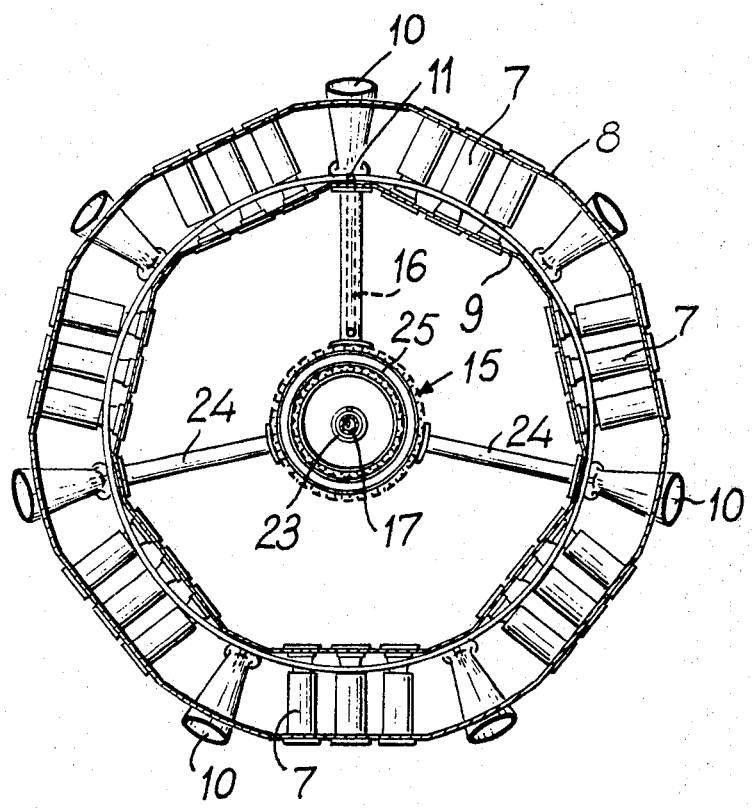
FIG. 3 is a cross-section through the line III—III in FIG. 2.

FIGS. 1 and 2 illustrate an air intake, generally designated by reference numeral 1, of a fragmentally and schematically portrayed turbine engine 2 fixed to the structure 3 of a helicopter fuselage.

Air intake 1 is formed by an inlet duct 4 of the Pitot type in order to ensure an undisturbed aerodynamic flow and a good pressure distribution at the turbine engine compressor entry 5.

Inlet duct 4 of annular section forms a divergent, an intermediate section of which is provided with a filtering system 6 which effects separation by inertia and is based on separator elements 7, well-known per se, arranged radially between the two coaxial walls 8 and 9 of the box-type structure of the divergent. Externally, elements 7 are formed by a tube which is fixed to wall 8 and provided with helical finning to impart swirl to the air charged with solid substances, and internally by a separator cone which is fixed to inner wall 9 and isolates said substances of which the cleansed air has been rid by centrifuging. Such substances — sand, dust and gravel — are then discharged to the exterior through ejectors 10 which, under the control of an electrically operated valve 10a, are fed through a conduit 11 with compressed air bled from the compressor exit end. Over the entire periphery of the rear part of divergent lip 12, upstream of filter system 6, are provided deflector elements 13 so profiled as to generate a disturbed air flow in that area in order to prevent icing at the inlet to separator elements 7 and consequent obstruction thereof. Positioned inside air intake duct 4 is a tapering body 14 (hereinafter termed "bullet") which is axially movable responsively to a pneumatic jack 15 fed through a conduit 16 with air bled from the compressor exit and controlled by the pilot by means of electrically operated valve 10a. The bullet is connected to the jack through having its front end attached to the rod 17 of a piston 18 sliding in a jack cylinder 19, into the end of which cylinder conduit 16 has port. Rod 17 slides through a guide 20 fast with struts 21 fixed to the inner wall 9 of the intake duct.

The struts 21 cooperate in the axial guidance of the bullet, the rear of which is slotted to match struts 21.

The rear of guide 20 is formed with a thrust collar 22 for receiving the end of a return spring 23 the other end of which reacts against a cup fast with the inward end of piston 18. Cylinder 19 is supported by arms 24 and makes contact with piston 18 through a sealing membrane 25.

In its median portion corresponding to its point of tangency with the inward end of lip 12, bullet 14 is formed with a groove 26 for receiving a ring 27 which provides sealing pressure contact when the bullet is in its forward position shown in FIG. 1.

The internal surface of intake duct lip 12 and the external surface of movable bullet 14, piston 18 and cylinder 19 are covered with a cellular substance 28 having a high noise absorbing capacity whereby to attenuate the noise produced by the engine compressor.

The multipurpose equipment positioned in front of the air intake of a helicopter turbine engine operates in the following manner:

When the helicopter is hovering close to the ground, the pilot opens the electrically operated valve, whereby as shown in FIG. 1 movable bullet 14 positions itself forwardly and seals off the air inlet of intake duct 4.

The whole of the air supplied to the engine then flows through filtering system 6 and is thereby rid of any solid particles (sand or dust) which it might contain in abundance during this flight phase. Such collected particles are discharged harmlessly through ejectors 10, which are simultaneously supplied with air when valve 10a is opened.

In this configuration, in which the maximum amount of noise may affect a populated area due to the closeness of the machine to the ground, engine compressor noise abatement is greatest, for because of the fact that the forward air inlet orifice is sealed off by the bullet 14 lined with noise absorbing substance 28, such sealing constitutes an effective barrier to the propagation of sound waves from the compressor.

As the helicopter begins forward flight and recedes from the ground, the pilot cuts off the air supply to jack 15 through valve 10a, whereupon movable bullet 14 is returned to its rearmost position by the spring 23, thus causing jack 15 to retract. This in turn enables the air supply for the engine to flow directly into engine intake 2 via the axial annular space available around the bullet inside the inlet duct, thereby to enable advantage to be taken of the ram effect produced by the forward motion of the helicopter. In this configuration, the compressor noise abatement provided by the soundproof lining 28 on the surface of bullet 14 and on the internal surface of the intake duct lip remains adequate in the vicinity of populated areas because of the then higher altitude of the helicopter.

During flights in icing atmospheres, or when there is a risk of snow or ice being ingested into the engine, movable bullet 14 is positioned in its most forward position. Under such conditions, the engine air supply flows through the filtering system 6, thereby entirely eliminating any risk of snow or ice entering the engine. For the deflector elements 13 provided externally, upstream of the filtering ring, generate about the latter, by reason of the forward speed of the aircraft, a lifting of the air fillets that prevents icing at the inlets to the separator tubes of filtering system 6 and consequent clogging thereof in flight.

It has been found furthermore that such separator elements 7 behave like de-icing devices and that no ice is formed inside the filtering boxes. This anti-icing effect is accordingly sufficient to protect the engine even when hovering in an icing atmosphere.

It goes without saying that changes and substitutions may be made to the forms of embodiment hereinbefore described, without departing from the scope of the invention. Moreover, the applications of the present invention are by no means restricted to rotary-wing aircraft but extend also to fixed-wing aircraft and more particularly to those of the short or even vertical take-off type.

What I claim is:

1. Air intake apparatus for a turbine engine of an aircraft particularly for a helicopter comprising in combination an inlet duct formed of an annular hollow housing having exterior and interior walls forming an opening at the forward end and flaring divergently outward toward the rear end, a streamlined bullet located within said duct, a thrust mechanism located within said duct for axially moving said bullet into and out of sealing position in said central opening, said thrust mechanism being supported on a plurality of radial struts secured to the interior wall of said duct and partially blocking said duct, a plurality of inertial particle separators radially aligned between the exterior and interior walls of said housing intermediate the forward and rear ends thereof, each of said separators having an inlet in the external wall of said housing for free communication with external air, a first outlet in said interior wall for communication with said duct and a second outlet communicating into the space between the external and internal walls of said housing for the accumulation of particles therein, said inlet and first outlet of said separator being constantly open to provide free flow of air into said duct, at least one channel extending rearwardly from the space between said external and internal walls of said housing and opening in the exterior wall of said housing for the discharge of said particles, and deflector elements stationarily positioned externally about said duct upstream of said separator to disturb the flow of said external air reaching the inlet of said separators.

2. Air intake apparatus for a turbine engine of an aircraft and more particularly a helicopter, comprising in combination, a divergent annular air inlet duct, a streamlined bullet capable of sealing off the interior of said duct and axially movable by a thrust mechanism connected to said inlet duct, said duct being formed by an annular hollow housing having an internal and external wall, a plurality of radially aligned inertial particle separator elements within said housing in an intermediate section thereof extending with their longitudinal axes radial of said duct and arranged in a plural number of groups symmetrically about the annular duct housing, each group being separated by a longitudinal section of duct, said separator elements having an inlet open on the external wall of said housing and being fed with external air and having an outlet open within said housing to accumulate said particles, at least one channel extended from between said longitudinal sections outwardly of said external wall for discharge of said particles and deflector elements positioned externally about said duct section upstream of said separators to disturb the flow of said external air reaching the inlet of said separators, the internal surface of the forward end of said duct, the external surface of the cone and of said thrust mechanism being made of sound-dampening material.

3. The apparatus according to claim 2 including air ejector means for regulating the flow through said discharge channel and means for controlling said air ejector simultaneously with the movement of said bullet.

4. The apparatus according to claim 3 in which said bullet is connected to the piston-rod of a compressed-air jack which is supplied through a feed conduit common to said jack and to said air ejector for discharging said particles, a single valve being connected into said feed conduit for feeding air thereto.

5. The apparatus according to claim 2 including an annular seal located on at least one of said bullet or the internal wall of said duct operating to seal said duct on closing of said bullet.

* * * * *